United States Patent
Reader

(10) Patent No.: US 10,759,307 B2
(45) Date of Patent: Sep. 1, 2020

(54) SEAT CUSHION LENGTH ADJUSTER

(71) Applicant: GM Global Technology Operations LLC, Detroit, MI (US)

(72) Inventor: Edeena A. Reader, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/138,126

(22) Filed: Sep. 21, 2018

(65) Prior Publication Data
US 2020/0094710 A1    Mar. 26, 2020

(51) Int. Cl.
*B60N 2/02*   (2006.01)
*A61G 5/10*   (2006.01)
*A47C 1/023*  (2006.01)

(52) U.S. Cl.
CPC ......... *B60N 2/0284* (2013.01); *B60N 2/0232* (2013.01); *A47C 1/023* (2013.01); *A61G 5/1064* (2013.01); *B60N 2/0224* (2013.01); *B60N 2002/024* (2013.01); *B60N 2002/0236* (2013.01)

(58) Field of Classification Search
CPC .. B60N 2/0284; B60N 2/0232; B60N 2/0224; B60N 2/62; B60N 2/914; A47C 1/023; A61G 5/1064
USPC .................................................. 297/284.11
See application file for complete search history.

(56) References Cited

U.S. PATENT DOCUMENTS

| | | | | |
|---|---|---|---|---|
| 7,874,621 | B2* | 1/2011 | Gumbrich | B60N 2/0284 297/284.11 |
| 7,997,648 | B2* | 8/2011 | Becker | B60N 2/0284 297/284.11 |
| 8,128,167 | B2* | 3/2012 | Zhong | B60N 2/62 297/284.11 |
| 9,371,011 | B2* | 6/2016 | Lee | B60N 2/62 |
| 9,616,775 | B2* | 4/2017 | Rehfuss | B60N 2/0232 |
| 9,751,429 | B2* | 9/2017 | Planson | B60N 2/0232 |
| 9,776,531 | B2* | 10/2017 | Kim | B60N 2/929 |
| 9,963,055 | B2* | 5/2018 | Seo | B60N 2/995 |
| 10,202,052 | B2* | 2/2019 | Nakamura | B60N 2/0732 |
| 10,266,073 | B2* | 4/2019 | Line | B60N 2/0232 |
| 2014/0292051 | A1 | 10/2014 | Planson et al. | |
| 2016/0339806 | A1 | 11/2016 | Popescu | |

(Continued)

FOREIGN PATENT DOCUMENTS

| | | |
|---|---|---|
| DE | 69118846 T2 | 12/1996 |
| DE | 10222995 C1 | 6/2003 |

(Continued)

*Primary Examiner* — Syed A Islam

(57) ABSTRACT

A seat assembly includes a seat frame, a sub frame, an electric motor, a transmission, and a flexible drive shaft. The seat frame includes a front support portion and supports a bottom cushion. The sub frame has a top plate and a base plate. The top plate supports a front cushion and rotatably supports a screw gear. The electric motor includes a first output member and is fixedly mounted to the front support portion of the seat frame. The transmission includes an input member and a second output member. The transmission is fixedly mounted to the base plate of the sub frame. The second output member of the transmission is drivingly connected to the screw gear of the sub frame. The flexible drive shaft is drivingly connecting the first output member of the electric motor to the input member of the transmission.

16 Claims, 5 Drawing Sheets

(56) References Cited

U.S. PATENT DOCUMENTS

| | | | |
|---|---|---|---|
| 2018/0251043 A1 | 9/2018 | Falster et al. | |
| 2019/0135139 A1 | 5/2019 | Ioppolo et al. | |
| 2019/0160990 A1* | 5/2019 | Morrow | B60N 2/72 |
| 2019/0322202 A1* | 10/2019 | Hur | B60N 2/933 |

FOREIGN PATENT DOCUMENTS

| | | |
|---|---|---|
| DE | 102011088434 A1 | 6/2003 |
| DE | 202006001969 U1 | 6/2007 |
| DE | 102007049865 A1 | 7/2008 |
| DE | 102008008924 A1 | 8/2009 |
| DE | 102008009440 A1 | 8/2009 |
| DE | 102008049923 A1 | 8/2009 |
| DE | 102014107925 A1 | 12/2015 |
| DE | 102014222593 A1 | 5/2016 |
| DE | 102016121677 A1 | 1/2018 |
| FR | 2958593 A1 | 10/2011 |
| JP | 2009279952 A | 12/2009 |
| KR | 1020100033580 A | 12/2009 |
| WO | 2015113633 A1 | 8/2015 |
| WO | 2017206848 A1 | 12/2017 |
| WO | 2019175150 A1 | 9/2019 |

\* cited by examiner

SEAT CUSHION LENGTH ADJUSTER

INTRODUCTION

The present disclosure relates generally to the design of automotive seat assemblies and more particularly to mechanisms for seat adjustment.

In order to provide flexibility to drivers and passengers of motor vehicles, manufacturers generally include front seat assemblies having adjustment mechanisms. For example, a vehicle can be fitted with the same seat assembly that can be adjusted to comfortably fit drivers and passengers of different heights. However, additional adjustments are required that in order to accommodate even more variation between drivers. Furthermore, while many of the adjustments are conveniently activated by electo-mechanical systems, not all of the adjustment capabilities on seat assemblies are activated at the touch of a button. Thus, while seat assemblies achieve their intended purpose, there is a need for a new and improved seat assembly that maintains the current level of functionality, adds additional adjustment features, and activates such features through lower effort electo-mechanical systems.

SUMMARY

According to several aspects, a seat assembly for a vehicle is provided. The seat assembly includes a seat frame, a sub frame, an electric motor, a transmission, and a flexible drive shaft. The seat frame includes a front support portion and supports a bottom cushion. The sub frame has a top plate and a base plate. The top plate supports a front cushion and rotatably supports a screw gear. The electric motor includes a first output member and is fixedly mounted to the front support portion of the seat frame. The transmission includes an input member and a second output member. The transmission is fixedly mounted to the base plate of the sub frame. The second output member of the transmission is drivingly connected to the screw gear of the sub frame. The flexible drive shaft is drivingly connecting the first output member of the electric motor to the input member of the transmission.

In one example of the present disclosure, the base plate of the sub frame includes a housing and the transmission is fixedly mounted in the housing.

In another example of the present disclosure, the electric motor is fixedly mounted to a bottom surface of the front support of the seat frame.

In yet another example of the present disclosure, the electric motor is fixedly mounted to a top surface of the front support of the seat frame.

In yet another example of the present disclosure, the electric motor comprises an axis of rotation and is mounted to the front portion of the seat frame with the axis of rotation vertical and perpendicular to the screw gear of the sub frame.

In yet another example of the present disclosure, the top plate of the sub frame is slidingly supported by the base plate.

In yet another example of the present disclosure, the base plate is fixedly mounted to the front support portion of the seat frame.

In yet another example of the present disclosure, the electric motor is a low-profile pancake style electric motor.

In yet another example of the present disclosure, the upper plate of the sub frame is slidingly supported by the base plate and is capable of relative movement to the base plate in a fore and an aft direction.

In yet another example of the present disclosure, the screw gear of the sub frame is rotatably supported medially by the top plate.

In yet another example of the present disclosure, a seat assembly for a vehicle is provided having a seat frame, a sub frame, an electric motor, a transmission, and a flexible drive shaft. The seat frame has a front support portion, and wherein the seat frame supports a bottom cushion. The sub frame includes a top plate and a base plate. The top plate supports a front cushion and rotatably supports a screw gear. The base plate comprises a housing. The base plate is fixedly mounted to the front support portion of the seat frame. The electric motor includes a first output member. The electric motor is fixedly mounted to the front support portion of the seat frame. The transmission includes an input member and a second output member. The transmission is fixedly mounted in the housing of the base plate of the sub frame and the second output member of the transmission is drivingly connected to the screw gear of the sub frame. The flexible drive shaft drivingly connects the first output member of the electric motor to the input member of the transmission.

In yet another example of the present disclosure, the electric motor is fixedly mounted to a bottom surface of the front support portion of the seat frame.

In yet another example of the present disclosure, the electric motor is fixedly mounted to a top surface of the front support portion of the seat frame.

In yet another example of the present disclosure, the electric motor comprises an axis of rotation and is mounted to the front portion of the seat frame with the axis of rotation vertical and perpendicular to the screw gear of the sub frame.

In yet another example of the present disclosure, the electric motor is a low-profile pancake style electric motor.

In yet another example of the present disclosure, the top plate of the sub frame is slidingly supported by the base plate and is capable of relative movement to the base plate in a fore and an aft directions.

In yet another example of the present disclosure, the screw gear of the sub frame is rotatably supported medially by the top plate.

In yet another example of the present disclosure, a seat assembly for a vehicle is provided including a seat frame, a sub frame, an electric motor, a transmission, and a flexible drive shaft. The seat frame comprising a front support portion. The seat frame supports a bottom cushion. The sub frame includes a top plate and a base plate. The top plate supports a front cushion and a screw gear is medially and rotatably supported by the top plate. The base plate comprises a housing and is fixedly mounted to the front support portion of the seat frame. The top plate of the sub frame is slidingly supported by the base plate and is capable of relative movement to the base plate in a fore and an aft direction. The electric motor comprising a first output member. The electric motor is fixedly mounted to a bottom surface of the front support portion of the seat frame. The transmission comprises an input member and a second output member. The transmission is fixedly mounted in the housing of the base plate of the sub frame and the second output member of the transmission is drivingly connected to the screw gear of the sub frame. The flexible drive shaft drivingly connects the first output member of the electric motor to the input member of the transmission.

In yet another example of the present disclosure, the electric motor comprises an axis of rotation and is mounted to the front portion of the seat frame with the axis of rotation vertical and perpendicular to the screw gear of the sub frame.

In yet another example of the present disclosure, the electric motor is a low-profile pancake style electric motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
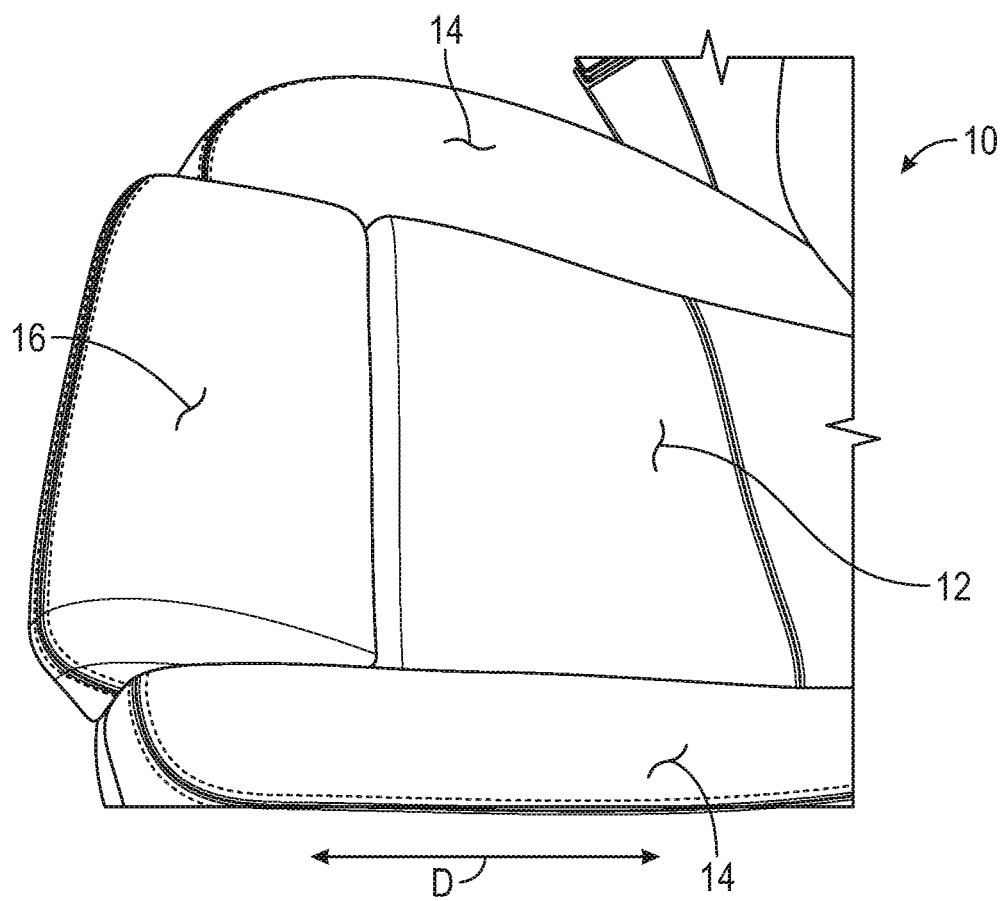
FIG. 1 is a perspective view of a vehicle seat assembly according to the principles of the present disclosure.
Figure 2:
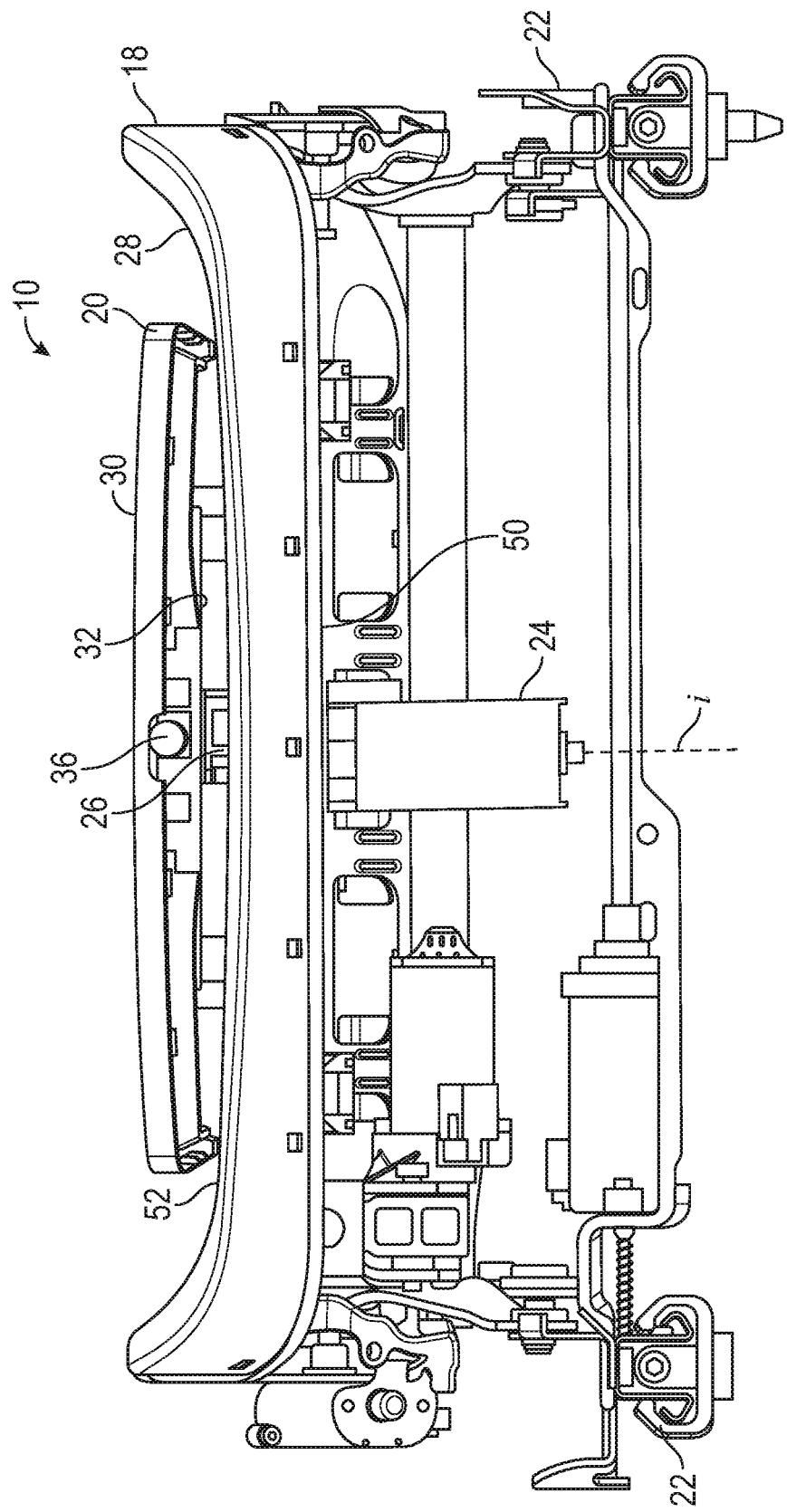
FIG. 2 is a front view of a portion of a vehicle seat frame assembly according to the principles of the present disclosure.

Examples of the present disclosure advantageously provide a seat assembly 10 for a vehicle. Referring to the figures, wherein like components are referred to with like numbers, FIGS. 1 and 2 illustrate a lower portion of a seat assembly 10 which will now be described. In general, FIG. 1 shows the of the seat assembly 10 including a bottom cushion 12, a pair of side cushions 14, and an adjustable front cushion 16. The bottom cushion 12 and the side cushions 14 are mounted to a seat frame 18 shown in FIG. 2. The front cushion 16 is mounted to a sub frame 20 which is capable of relative movement with the seat frame 18 and therefore the bottom cushion 12 and side cushions 14. Referring more particularly to FIG. 2, the seat assembly 10 includes the seat frame 18, the sub frame 20, a pair of frame rails 22, a first electric motor 24, and a flexible drive shaft 26 (shown in FIGS. 3-6). More particularly, the seat frame 18 is mounted to the frame rails 22 which are secured to the vehicle (not shown). The seat frame 18 is capable of movement in the fore and aft directions D relative to the frame rails 22. The sub frame 20 is mounted to a front portion 28 of the seat frame 18. The first electric motor 24 includes a first output member 44 and is mounted to the bottom surface 50 of the front portion 28 of the seat frame 18 such that the drive axis of rotation i of the first electric motor 24 is vertical relative to the seat frame 18. However, the first electric motor 24 may be mounted in other orientations without departing from the scope of the disclosure. For example, if more packaging space is required, the first electric motor 24 may be mounted horizontally with respect to the seat frame 18. A first end 54 of the flexible drive shaft 26 is drivingly connected to the first output member 44 of the first electric motor 24.

Figure 3:
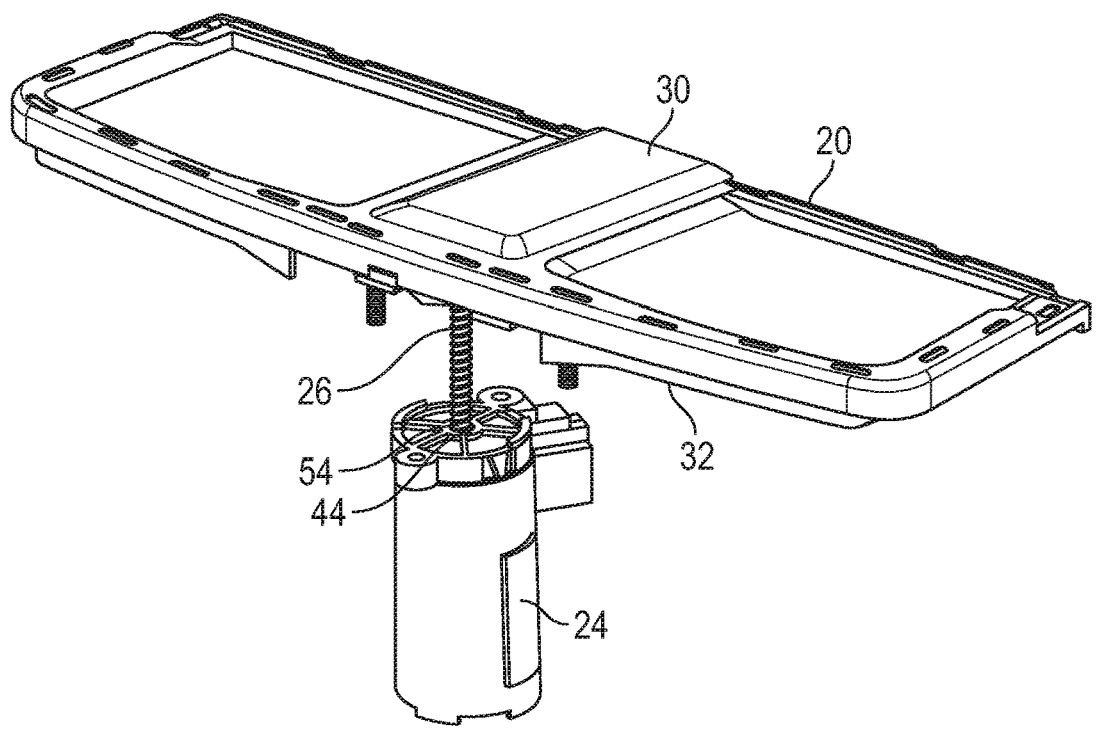
FIG. 3 is a top perspective view of a portion of a vehicle seat assembly according to the principles of the present disclosure.
Figure 4:
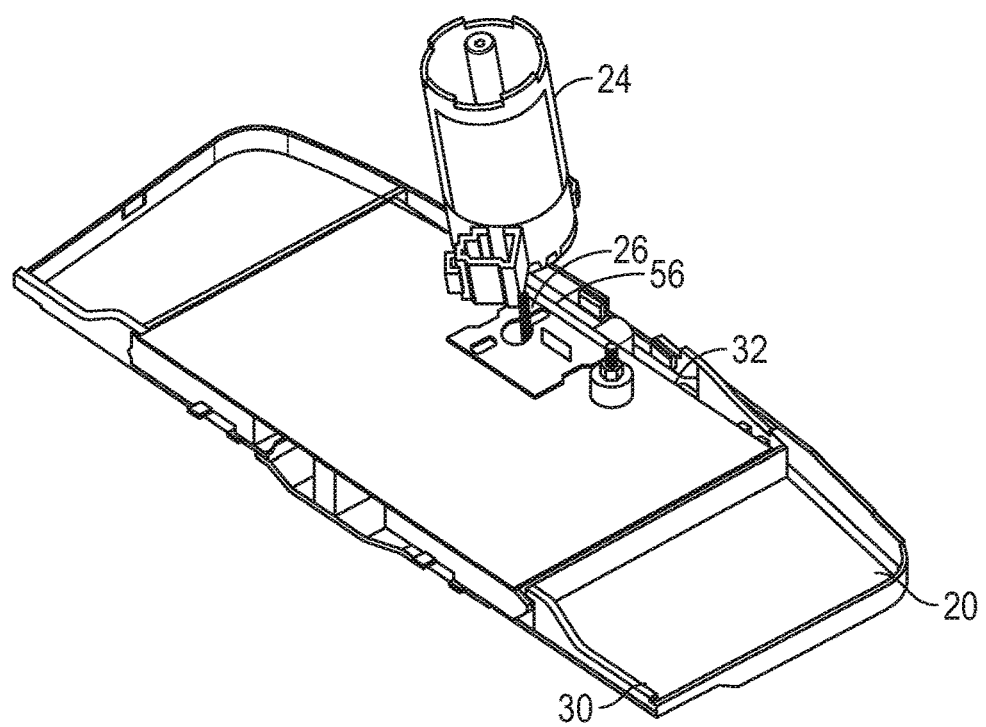
FIG. 4 is bottom perspective view of a portion of a vehicle seat assembly according to the principles of the present disclosure.
Figure 5:
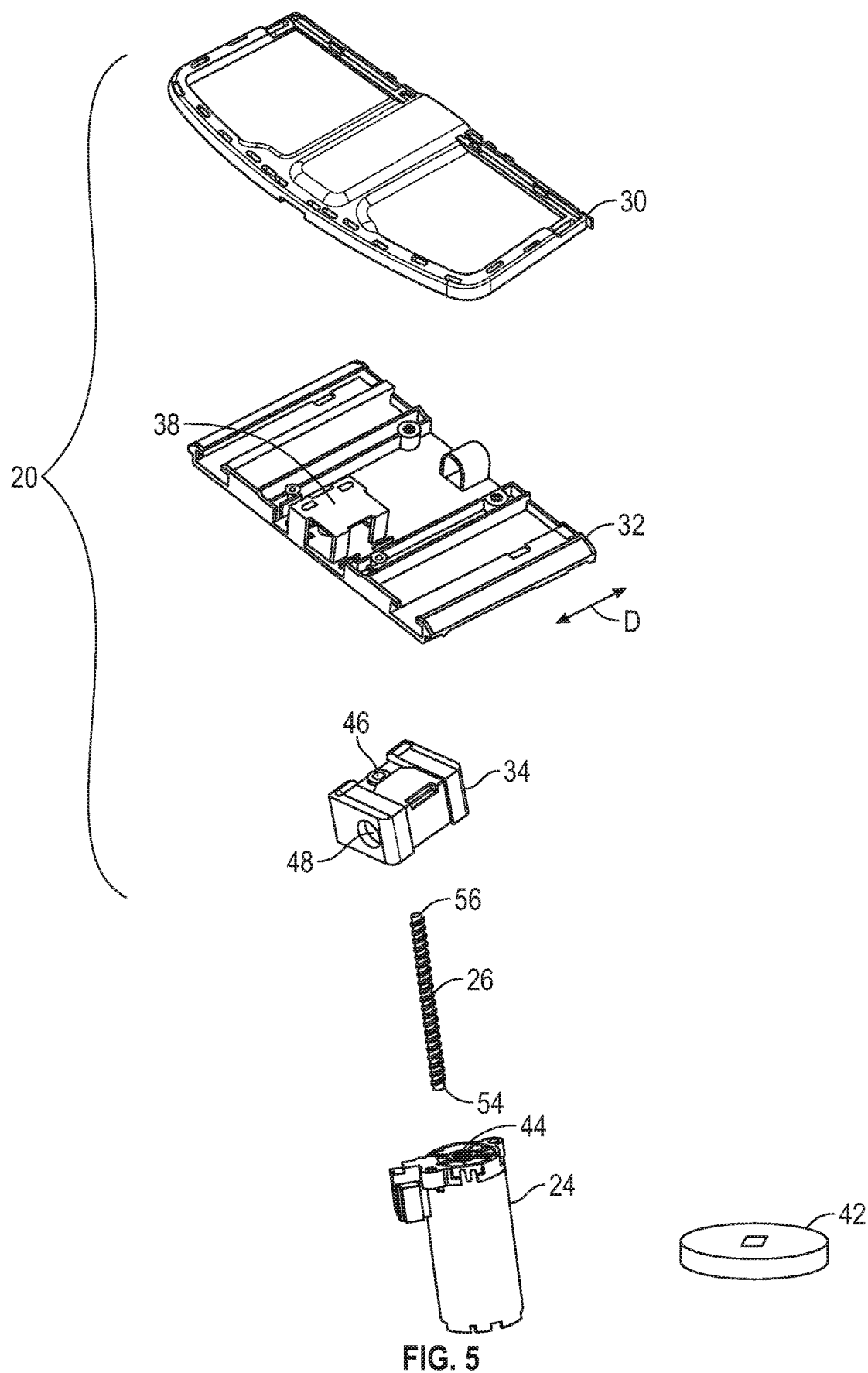
FIG. 5 is an expanded perspective view of a portion of a vehicle seat assembly according to the principles of the present disclosure.
Figure 6:
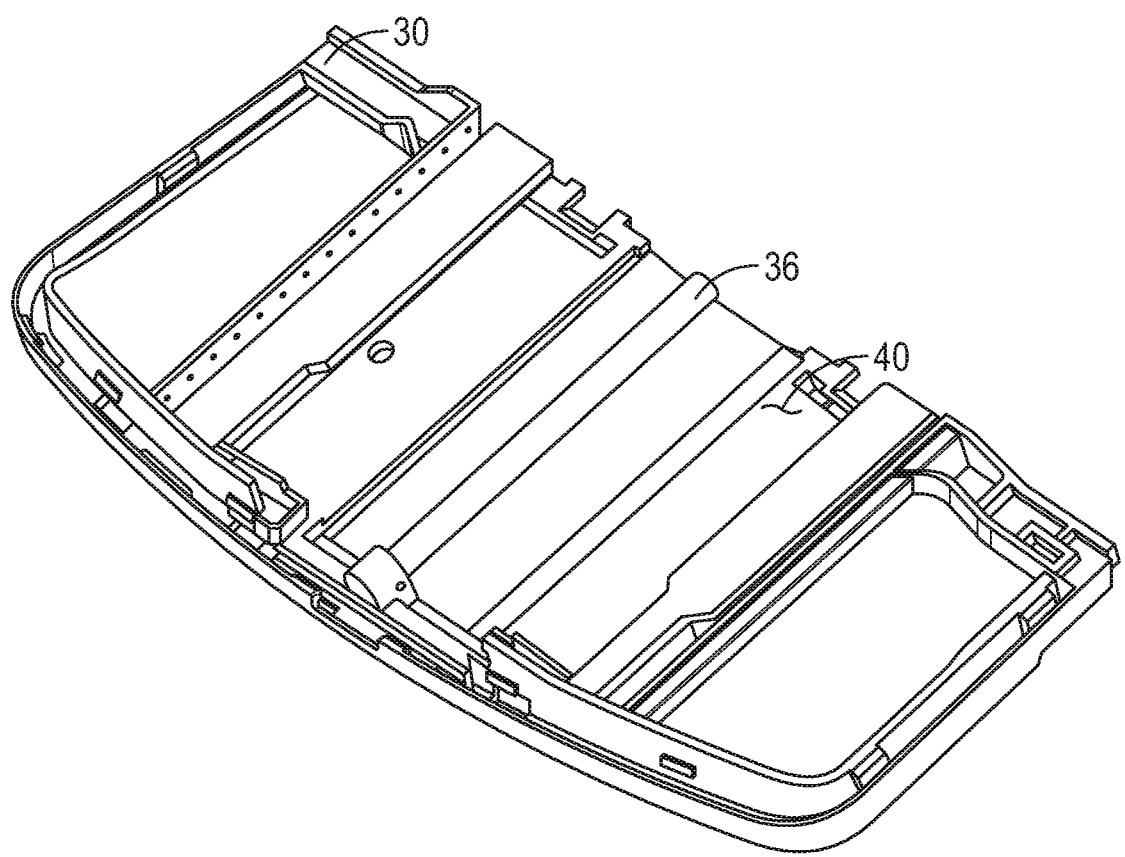
FIG. 6 is a bottom perspective view of a portion of a vehicle seat assembly according to the principles of the present disclosure.

Turning now to FIGS. 5 and 6, with continuing reference to FIGS. 2-4, the sub frame 20 includes an upper plate 30, a base plate 32, a transmission 34, and a screw gear 36. More particularly, the base plate 32 is mounted to the seat frame 18 and includes a housing portion 38 in which the transmission 34 is fixedly mounted. The upper plate 30 is slidingly supported by the base plate 32 and is capable of relative movement with the base plate 32 in the fore and aft directions D. The transmission 34 includes an input member 46 and an output member 48. The screw gear 36 is rotatably supported on the bottom side 40 of the upper plate 30 and is drivingly connected with the output member 48 of the transmission 34 while input member 46 of the transmission 34 is drivingly connected to a second end 56 of the flexible drive shaft 26. Thus, the rotational torque delivered to the transmission 34 by the first electric motor 24 via the flexible drive shaft 26 is translated to a linear force capable of moving the upper plate 30 of the sub assembly relative to the seat frame 18. Alternatively, a second electric motor 42 may be employed in place of the first electric motor 24 for packaging purposes. The second electric motor 42 is a low-profile pancake style electric motor. In this manner, alternative arrangements between the second electric motor 42, the seat frame 18 and the sub frame 20 may be made without departing from the scope of the disclosure. For example, the second electric motor 42 may be mounted to the top surface 52 of the front portion 28 of the seat frame 18 as packaging space allows.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat assembly for a vehicle, the seat assembly comprising: a seat frame comprising a front support portion, and wherein the seat frame supports a bottom cushion; a sub frame comprising a top plate and a base plate, and wherein the top plate supports a front cushion and rotatably supports a screw gear; an electric motor comprising a first output member, and wherein the electric motor is fixedly mounted to the front support portion of the seat frame; a transmission comprising an input member and a second output member, and wherein the transmission is fixedly mounted to the base plate of the sub frame and the second output member of the transmission is drivingly connected to the screw gear of the sub frame; and a flexible drive shaft drivingly connecting the first output member of the electric motor to the input member of the transmission, wherein the electric motor is fixedly mounted to a top surface of the front support portion of the seat frame.

2. The seat assembly of claim 1 wherein the base plate of the sub frame includes a housing and the transmission is fixedly mounted in the housing.

3. The seat assembly of claim 1 wherein the electric motor comprises an axis of rotation and is mounted to the front portion of the seat frame with the axis of rotation vertical and perpendicular to the screw gear of the sub frame.

4. The seat assembly of claim 1 wherein the top plate of the sub frame is slidingly supported by the base plate.

5. The seat assembly of claim 1 wherein the base plate is fixedly mounted to the front support portion of the seat frame.

6. The seat assembly of claim 1 wherein the electric motor is a low-profile pancake style electric motor.

7. The seat assembly of claim 1 wherein the top plate of the sub frame is slidingly supported by the base plate and is capable of relative movement to the base plate in a fore and an aft direction.

8. The seat assembly of claim 1 wherein the screw gear of the sub frame is rotatably supported medially by the top plate.

9. A seat assembly for a vehicle, the seat assembly comprising: a seat frame comprising a front support portion, and wherein the seat frame supports a bottom cushion; a sub frame comprising a top plate and a base plate, and wherein the top plate supports a front cushion and rotatably supports a screw gear, the base plate comprises a housing, and the base plate is fixedly mounted to the front support portion of the seat frame; an electric motor comprising a first output member, and wherein the electric motor is fixedly mounted to the front support portion of the seat frame; a transmission comprising an input member and a second output member, and wherein the transmission is fixedly mounted in the housing of the base plate of the sub frame and the second output member of the transmission is drivingly connected to the screw gear of the sub frame; and a flexible drive shaft drivingly connecting the first output member of the electric motor to the input member of the transmission, wherein the electric motor is fixedly mounted to a top surface of the front support portion of the seat frame.

10. The seat assembly of claim 9 wherein the electric motor comprises an axis of rotation and is mounted to the front portion of the seat frame with the axis of rotation vertical and perpendicular to the screw gear of the sub frame.

11. The seat assembly of claim 10 wherein the electric motor is a low-profile pancake style electric motor.

12. The seat assembly of claim 11 wherein the top plate of the sub frame is slidingly supported by the base plate and is capable of relative movement to the base plate in a fore and an aft direction.

13. The seat assembly of claim 12 wherein the screw gear of the sub frame is rotatably supported medially by the top plate.

14. A seat assembly for a vehicle, the seat assembly comprising:
- a seat frame comprising a front support portion, and wherein the seat frame supports a bottom cushion;
- a sub frame comprising a top plate and a base plate, and wherein the top plate supports a front cushion and a screw gear is medially and rotatably supported by the top plate, the base plate comprises a housing, the base plate is fixedly mounted to the front support portion of the seat frame, and the top plate of the sub frame is slidingly supported by the base plate and is capable of relative movement to the base plate in a fore and an aft directions;
- an electric motor comprising a first output member, and wherein the electric motor is fixedly mounted to a top surface of the front support portion of the seat frame;
- a transmission comprising an input member and a second output member, and wherein the transmission is fixedly mounted in the housing of the base plate of the sub frame and the second output member of the transmission is drivingly connected to the screw gear of the sub frame; and
- a flexible drive shaft drivingly connecting the first output member of the electric motor to the input member of the transmission.

15. The seat assembly of claim 14 wherein the electric motor comprises an axis of rotation and is mounted to the front portion of the seat frame with the axis of rotation vertical and perpendicular to the screw gear of the sub frame.

16. The seat assembly of claim 15 wherein the electric motor is a low-profile pancake style electric motor.

* * * * *